United States Patent [19]

Lewis

[11] 3,959,854

[45] June 1, 1976

[54] TABLE SKIRT MOUNTING

[76] Inventor: Edward M. Lewis, 151 S. Delaplaine Road, Riverside, Ill. 60546

[22] Filed: Feb. 6, 1975

[21] Appl. No.: 547,559

[52] U.S. Cl. ............................. 24/84 B; 5/333
[51] Int. Cl.² .................... A44B 13/00; A47C 21/00
[58] Field of Search .......... 24/81, 84 B, 84 H, 84 R, 24/85 B, 255 TC, 255 FF, 85 B, 86 B; 5/333

[56] References Cited
UNITED STATES PATENTS

| | | | |
|---|---|---|---|
| 601,354 | 3/1898 | Osmers | 24/259 FF |
| 902,407 | 10/1908 | Humphrey | 24/84 B |
| 1,856,847 | 5/1932 | Gates | 24/84 R X |
| 3,019,954 | 2/1962 | Faltin | 24/81 BA X |
| 3,105,265 | 10/1963 | Takazawa | 24/86 C X |
| 3,767,152 | 10/1973 | Killinger | 24/84 B X |

FOREIGN PATENTS OR APPLICATIONS 13,369  10/1908  United Kingdom ..................... 5/333

Primary Examiner—Donald A. Griffin
Attorney, Agent, or Firm—Guy A. Greenawalt

[57] ABSTRACT

A spring clip arrangement for securing a table skirt to a table in which the clip is formed of spring metal with top and bottom resilient clamp fingers for engaging therebetween the margin of the table, which fingers extend from the top and bottom of a vertically disposed base member outboard of which there is an upstanding spring clamp member co-operating with the base member in providing a slot in which a portion at the top margin of the skirt is received and in which it is clamped by spreading of the table clamping fingers upon engagement with the table margin.

4 Claims, 7 Drawing Figures

U.S. Patent June 1, 1976 3,959,854
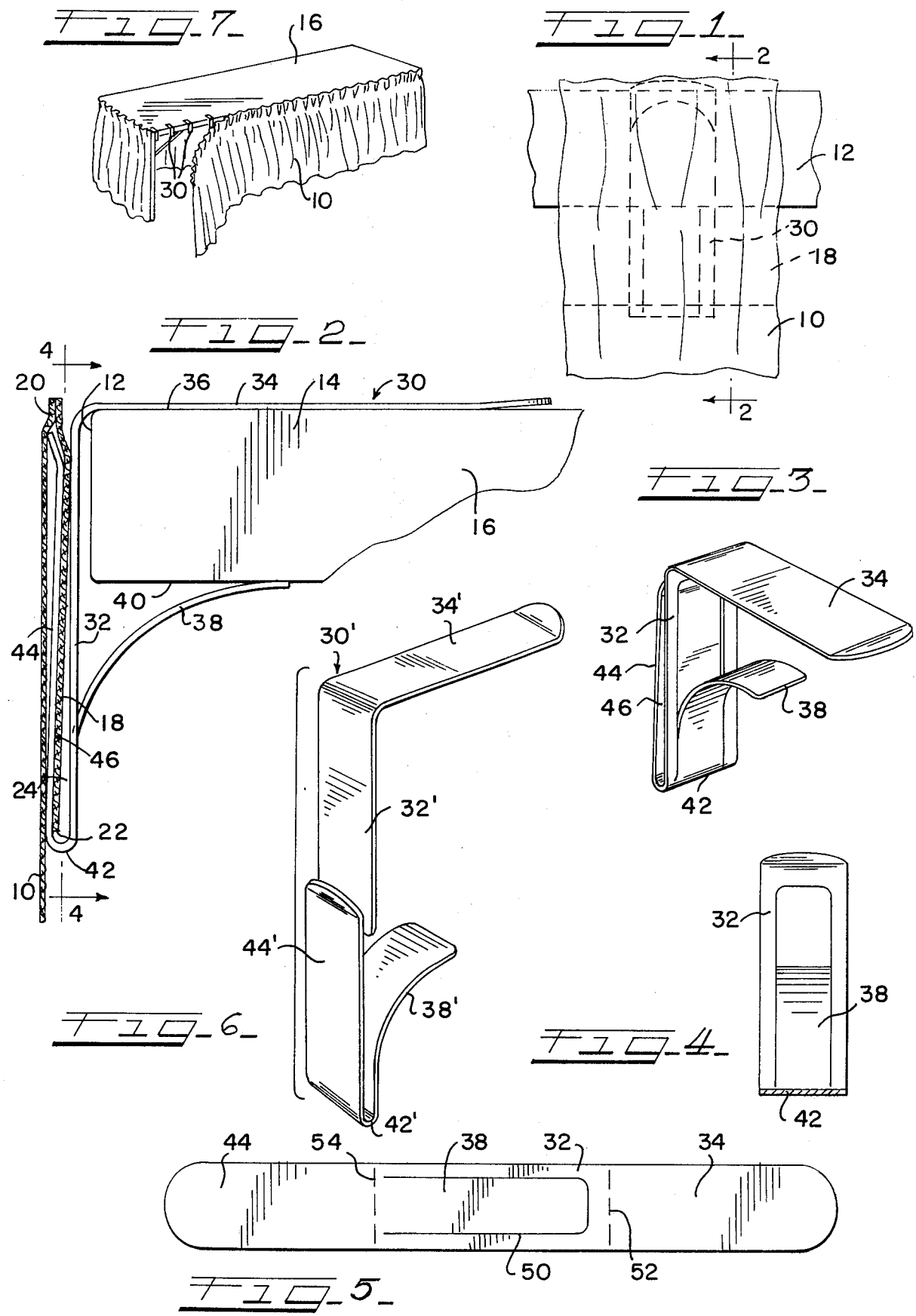

TABLE SKIRT MOUNTING

This invention relates to the assembly of a table skirt on a banquet table or the like and is more particularly concerned with improvements in means for securing a table skirt in downwardly draped position on the edge of a table surface.

It has long been the custom to install a drape forming table skirt on banquet tables, particularly, when the table is on a raised platform or otherwise elevated as is most often the case with the speakers' table. Various arrangements have been employed in mounting the skirt on the table, the most common being tacking or stapling the top margin of the skirt, which is frequently pleated and reinforced with some type of binding tape, onto the vertical edge of the table top or on the top near the table edge. This requires considerable time in accomplishing a task which is frequently required to be done hurriedly. Consequently, some efforts have been made to provide a more expeditious way of attaching the skirt so as to reduce the time and labor involved. Some clip arrangements have been devised, after the manner of drapery hanging arrangements, but these have not been entirely acceptable because of frequent breakage due to lack of strength or failure to save sufficient time and labor in the installation of the skirt. It is a general object, therefore, to provide an improved arrangement for securing the top margin of a table skirt to the table top which permits the skirt to be attached quickly with little effort and which is effective to securely fasten the skirt while permitting it to be readily and quickly removed when dismantling the table and skirt assembly.

A more specific object of the invention is to provide an improved means for securing the top portion of a table skirt to a table edge which requires minimum effort for installation and removal, which can be accomplished by one person without assistance, which requires no tools for installation or removal, which can be applied to table tops of varying thickness, within certain limits, which does not damage the skirt in any way, and which requires little or no alteration of the conventional skirt structure to adapt it for the improved fastening arrangement.

A still more specific object of the invention is to provide an improved means for securing a table skirt on a table top edge which comprises a spring clamp member having means to resiliently grip the table edge and to clamp onto the top margin of the skirt when installed so as to securely fasten the skirt in position while permitting ready release thereof when it is desired to remove the skirt from the table.

Another object of the invention is to provide an improved means for securing a table skirt on a table top edge which comprises a series of spring clips each of which is constructed to provide table gripping finger members extending from a base plate member which is adapted to seat against the edge of the table top and a skirt gripping finger generally parallel with the base plate and co-operating therewith in providing a slot for receiving a portion of the skirt at the top margin thereof which skirt gripping finger is constructed to swing on a bottom pivot portion into clamping relation with the skirt portion by spreading of the table gripping fingers upon installation of the clip on the table top.

These and other objects and advantages of the present invention will be apparent from a consideration of the table skirt clamping arrangement which is shown by way of illustration in the accompanying drawings wherein:

FIG. 1 is an elevational view showing a top portion of a table skirt installed on the edge of a table top by means of one of the spring clips which incorporates therein the principal features of the invention;

FIG. 2 is a cross sectional view taken on the line 2—2 of FIG. 1, to an enlarged scale;

FIG. 3 is a perspective view showing one of the spring clips;

FIG. 4 is a view taken on the line 4—4 of FIG. 2, to a smaller scale;

FIG. 5 is a plan view illustrating the manner in which a clip is cut and formed from strip stock;

FIG. 6 is a perspective, exploded view illustrating the formation of a clip from two pieces of stock material; and FIG. 7 is a perspective view showing a table with a skirt partially installed by means of the clips shown in FIGS. 1 to 6.

Referring to FIGS. 1 and 2, there is illustrated a portion of the top of a table skirt 10 mounted on the edge 12 of the marginal portion 14 of a table top 16, the latter being supported in any conventional manner. As shown, the table skirt 10 is provided at its top margin with a backing or webbing strip 18, in the form of a hem member, which is of substantial width, which is secured along the top edge 20, and which has the bottom edge 22 secured at spaced intervals, so as to provide downwardly opening pockets 24 for inserting therein clip members 30 which are adapted to clamp to the table margin 14 so as to secure the skirt in position thereon.

The clip member 30 is preferably formed from flat, relatively thin spring steel strip material so as to provide a base plate portion 32 with a top clamping finger forming member 34 extending in a plane normal to the plane of the base plate 32 and adapted to seat on the top surface 36 of the table top 16 and to be resiliently held in frictional engagement therewith by pressure exerted by a bottom clamping finger member 38 which extends in an upwardly and inwardly curved configuration from the bottom of the base plate 32 and provides with the top clamping finger 34 a space between the finger members for receiving the table top margin 14, the bottom finger member 38 being adapted to engage the bottom surface 40 of the table margin 14 and resiliently press against the same. The bottom clamping finger 38, in the form shown in FIGS. 1 to 3, is freed of the base plate 32 except at the bottom edge 42 where it joins the bottom of the skirt engaging finger member 44. The latter extends upwardly along the outboard face of the base plate 32 and co-operates therewith to provide a relatively narrow slot 46 for receiving the skirt webbing 18. The slot 46 is open when the clip 30 is not attached to the table and the minimum space between the finger members 34 and 38 is less than the smallest thickness of table for which the clip is designed. When the clamping finger members 34 and 38 are spread apart to receive the table margin the bottom finger member 38 acts as a lever to spring or pivot the top portion of the skirt engaging finger member 44 toward the base plate 32 so as to clamp the webbing 18. The clamping fingers 34 and 38 are constructed and spaced apart so as to accommodate a table margin of varying thickness, within predetermined limits.

In preparation for use of the clips 30, the skirt 10 is provided with the webbing 18 which is secured along the top edge while the bottom edge is unsecured at intervals so that the clips can be attached to the webbing 18 by insertion of the finger members 44 into the pockets formed between the webbing 18 and the top marginal portion of the skirt proper. The clips 30 are, of course, spaced as needed to hold the skirt in proper position.

The clips 30 may be formed from a length of a stock strip of spring steel material, as shown in FIG. 5. The proper length and the U-shaped cut 50 enable the clip to be formed by punching out the finger member 38 and bending the material on the transverse lines 52 and 54 into the shape shown in FIG. 3.

An alternate method of forming the clip is shown in FIG. 6 in which corresponding elements are indicated by the same numerals primed. The base plate 32' and the top clamping finger 34' are made in one piece. The clamping fingers 38' and 44' are formed, as shown, in a separate piece. The two pieces are then assembled by dropping the bottom edge of the base plate 32' into the lower curved portion 42' of the bent member forming the skirt engaging finger 44' and the bottom table engaging finger 38' and welding to form a permanent connection. The modified clip 30' thus formed is adapted to be used in the same manner as the clip 30.

The clip can be made in various sizes with provision for attaching to a support having a range of thickness differing from the conventional table top. Also, the top clamp or finger member may be covered with a sleeve of rubber or similar material which will provide further size adjustment.

While the invention is described above as especially applicable to securing a table skirt to a table top member it will be understood that it is equally applicable to securing a drape forming member, of a character similar to a table skirt, to the edge or margin of any support member of a character similar to a table top, such as, a shelf or the like. It can also be used to attach display items of a character which can be hung or clipped to a support of the character herein referred to.

I claim:

1. In combination with a skirt forming member having a top marginal portion providing downwardly opening pocket formations, a mounting clip for securing said skirt member to the edge portion of a support member in the form of a table top margin, which mounting clip comprises a base plate adapted to seat against the edge of said support member, clamp means extending from said base plate for frictionally securing the clip to the support member and an upwardly directed finger member adapted to seat in a downwardly opening pocket formation on the skirt, including spaced, resilient top and bottom support engaging finger members and said bottom finger member being connected to the bottom portion of said upwardly directed skirt engaging finger member so as to swing said skirt engaging finger member toward said base plate when said top and bottom support engaging finger members are urged apart.

2. A spring clip member for securing a top portion of a skirt forming member in depending relation from the edge of a support member having the form of the margin of a table top which clip member comprises a base plate member adapted to seat against the outboard edge of the support member and having spaced clamping fingers resiliently engaging the top and bottom surfaces of a marginal portion of the support member, a skirt engaging finger extending upwardly of the bottom of the base plate member and co-operating therewith to form a slot for receiving a top portion of the skirt member and for clamping engagement therewith, said spaced clamping fingers being connected to said base plate member and said skirt engaging finger, respectively, so that when said clamping fingers are spread apart, said skirt engaging finger will be urged toward said base plate member to close said slot and clamp the skirt therein.

3. A spring clip member for securing a top portion of a skirt forming member in depending relation from the edge of a support member having the form of the margin of a table top which clip member comprises a base plate member adapted to seat against the outboard edge of the support member and having spaced clamping fingers resiliently engaging the top and bottom surfaces of a marginal portion of the support member, a skirt engaging finger extending upwardly of the bottom of the base plate member and co-operating therewith to form a slot for receiving a top portion of the skirt member and for clamping engagement therewith, said spaced clamping fingers comprising a top finger member extending from the top edge of said base plate member and a bottom finger member extending upwardly from the bottom edge of said skirt engaging finger in the direction of said top finger member, said bottom finger member being joined to said skirt engaging finger and curved upwardly in the direction of said top finger member so as to swing said skirt engaging finger in the direction to close said slot and clamp said skirt forming member.

4. A spring clip member for securing a top portion of a skirt forming member in depending relation from the edge of a support member having the form of the margin of a table top which clip member comprises a base plate member adapted to seat against the outboard edge of the support and having a back face with vertically spaced clamping fingers extending from said back face and resiliently engaging the top and bottom surfaces of a marginal portion of the support, a skirt engaging finger extending upwardly of the bottom of the outboard face of said base plate member and co-operating therewith to form a slot for receiving a top portion of the skirt member and means urging said skirt engaging finger toward said base plate member for clamping engagement with said skirt member, said spaced clamping fingers comprising a top finger member extending from the top edge of said base plate member and a bottom finger member extending upwardly from the bottom edge of said skirt engaging finger in the direction of said top finger member and co-operating with said skirt engaging finger in forming said means for urging said skirt engaging finger toward said base plate member.

* * * * *